US006381702B1

(12) United States Patent
Ogasawara

(10) Patent No.: US 6,381,702 B1
(45) Date of Patent: Apr. 30, 2002

(54) ELECTRONIC CLOCK

(75) Inventor: Kenji Ogasawara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/381,762

(22) PCT Filed: Mar. 25, 1998

(86) PCT No.: PCT/JP98/01301

§ 371 Date: Nov. 29, 1999

§ 102(e) Date: Nov. 29, 1999

(87) PCT Pub. No.: WO98/44395

PCT Pub. Date: Oct. 8, 1998

(30) Foreign Application Priority Data

Mar. 27, 1997 (JP) .............................................. 9-076285

(51) Int. Cl.[7] ............................. G06F 1/04; G06F 1/08; G04B 17/20

(52) U.S. Cl. ........................ 713/500; 713/501; 713/502; 713/503; 710/58; 368/202

(58) Field of Search ....................... 710/1, 58; 713/500, 713/501, 502, 503; 368/202

(56) References Cited

U.S. PATENT DOCUMENTS 4,142,360 A * 3/1979 Akahane ...................... 58/23 R
4,427,302 A * 1/1984 Watanabe ................... 368/200
5,717,661 A * 2/1998 Poulson ....................... 368/202

* cited by examiner

*Primary Examiner*—Thomas Lee
*Assistant Examiner*—Rehana Perveen
(74) *Attorney, Agent, or Firm*—Adams & Wilks

(57) ABSTRACT

A highly accurate electronic timepiece is provided in which the operation of a logical slowdown/speedup circuit for adjusting accuracy is controlled by a CPU. The output of an oscillation circuit is input to a system clock generation circuit which generates a system clock for operating the CPU. The output of an oscillation circuit is also supplied to a frequency dividing circuit, and an output of the frequency dividing circuit is supplied to an interrupt signal generating circuit to generate an interrupt signal to the CPU. A logical slowdown/speedup circuit increments a logical slowdown/speedup cycle counter allocated in RAM upon each interrupt operation and, when a predetermined count is reached, the logical slowdown/speedup circuit operates to adjust the timekeeping accuracy of the timepiece. Slowdown/speedup data stored in the logical slowdown/speedup circuit is acquired from a slowdown/speedup data input port. The logical slowdown/speedup circuit operates at two different cycles to perform accuracy adjustment.

8 Claims, 6 Drawing Sheets

FIG. 3

| SLOWDOWN/ SPEEDUP BIT | 10 SEC. CYCLE | 320 SEC. CYCLE | 640 SEC. CYCLE |
|---|---|---|---|
| B0 | 264 msec/day | 8 msec/day | 4 msec/day |
| B1 | 527 msec/day | 16 msec/day | 8 msec/day |
| B2 | 1.05 sec/day | 33 msec/day | 16 msec/day |
| B3 | 2.11 sec/day | 66 msec/day | 33 msec/day |
| B4 | 4.22 sec/day | 132 msec/day | 66 msec/day |
| B5 | 8.44 sec/day | 264 msec/day | 132 msec/day |

ELECTRONIC CLOCK

TECHNICAL FIELD

The present invention relates to an electronic timepiece incorporating a microcomputer. More particularly, it relates to a highly accurate electronic timepiece in which the operation of a logical slowdown/speedup circuit for adjusting timepiece accuracy is controlled by a microcomputer.

Conventional electronic timepieces have utilized a quartz oscillation circuit of 32 kHz to perform logical slowdown/speedup on a cycle of 10 seconds. In this case, adjustment has been performed at an adjustment resolution of 1/32768×86400/10=264 msec./day, which value has created substantially no problem for accuracy of a monthly deviation of several tens of seconds. However, there has been a trend toward clocks of higher accuracy in the last few years, and electronic timepieces having high accuracy on the order of a yearly deviation of several tens of seconds have been developed.

In order to maintain an accuracy on the order of a yearly deviation of several tens of seconds, fine factory adjustment of accuracy is important, and the adjustment resolution of 264 msec./day has become ineffective.

Under such circumstances, various methods have been employed in high accuracy electronic timepieces to achieve finer adjustment resolutions. One method is the expansion of the cycle on which logical slowdown/speedup is performed in order to achieve a finer adjustment resolution. As shown in FIG. 2, a signal from an oscillation circuit 201 is subjected to frequency division by a frequency division circuit 202, and a logical slowdown/speedup circuit 205 is operated on cycles counted by a first slowdown/speedup cycle counter 203 to perform a slowdown/speedup operation according to data fetched through a slowdown/speedup data input port 207 and stored in a slowdown/speedup data storing circuit 206. For example, when a logical slowdown/speedup operation is performed on a cycle of 320 seconds, adjustment is possible at an adjustment resolution of 1/32768×86400/320=8 msec./day, and a sufficient resolution is thus obtained to provide a highly accurate electronic timepiece.

However, an expansion of a logical slowdown/speedup cycle results in a demerit in that the adjustable range is narrowed, although a finer adjustment resolution is achieved. Therefore, a logical slowdown/speedup operation has been performed also on a shorter cycle provided by a second slowdown/speedup cycle counter 204 to achieve a finer adjustment resolution and a wider adjustable range by combining logical slowdown/speedup operations on shorter and longer cycles.

However, for a conventional high accuracy electronic timepiece, a custom IC for the high accuracy electronic timepiece has been: developed after determining the operational cycle of the logical slowdown/speedup circuit and the number of bits of the slowdown/speedup data input port in advance. As a result, the minimum resolution and adjustable range of the logical slowdown/speedup circuit have been fixed, and actual factory adjustment of accuracy has faced a problem in that the yield of mass production has been significantly affected by inability to achieve target accuracy due to variation of adjusting accuracy from factory to factory and depending on the temperature, environment and the like. Further, an increase in cost can result from screening of quartz and the like when the frequency of the quartz used in oscillation circuits varies beyond the adjusting range fixed by the ICs. Further, while some ICs for high accuracy electronic timepieces include a correction means for after services provided when accuracy is deteriorated with time due to the aging properties of quartz and the like, a problem still arises in that re-adjustment can not be performed because the amount of adjustment allotted to the ICs at the time of the development of the same allows a slowdown/speedup amount that is too coarse or too fine for re-adjustment at retail shops and the like. These problems are found only after ICs are developed and products are released to factories and market and lead to various problems including a reduction of yield, cost increase and late deliveries associated with modifications of IC hardware.

SUMMARY OF THE INVENTION

The present invention first provides an electronic timepiece comprising an oscillation circuit, a system clock generation circuit for generating a system clock based on the output of the oscillation circuit, a frequency division circuit for performing frequency division on the output of the oscillation circuit, a ROM in which processing procedures such as a time-measuring operation of the clock are programmed, a CPU for interpreting the data programmed in the ROM to perform various arithmetic processes, a RAM for storing various data, an interrupt signal generation circuit for generating an interrupt signal to the CPU, a slowdown/speedup data input port for taking in slowdown/speedup data from the outside, a logical slowdown/speedup circuit for varying the frequency division ratio of the frequency division circuit to adjust accuracy, and a slowdown/speedup data storing circuit for storing slowdown/speedup data that determine the amount of slowdown/speedup at the logical slowdown/speedup circuit.

Second, there is provided a configuration which is the first configuration added with a slowdown/speedup correction data input port for taking in data from the outside for correcting the slowdown/speedup data input through the slowdown/speedup data input port.

BRIEF DESCRIPTION OF DRAWINGS

FIG. 3 is a list showing amounts of slowdown/speedup of a logical slowdown/speedup circuit of an electronic timepiece according to the present invention.

Best Mode for Carrying Out the Invention

Figure 1:
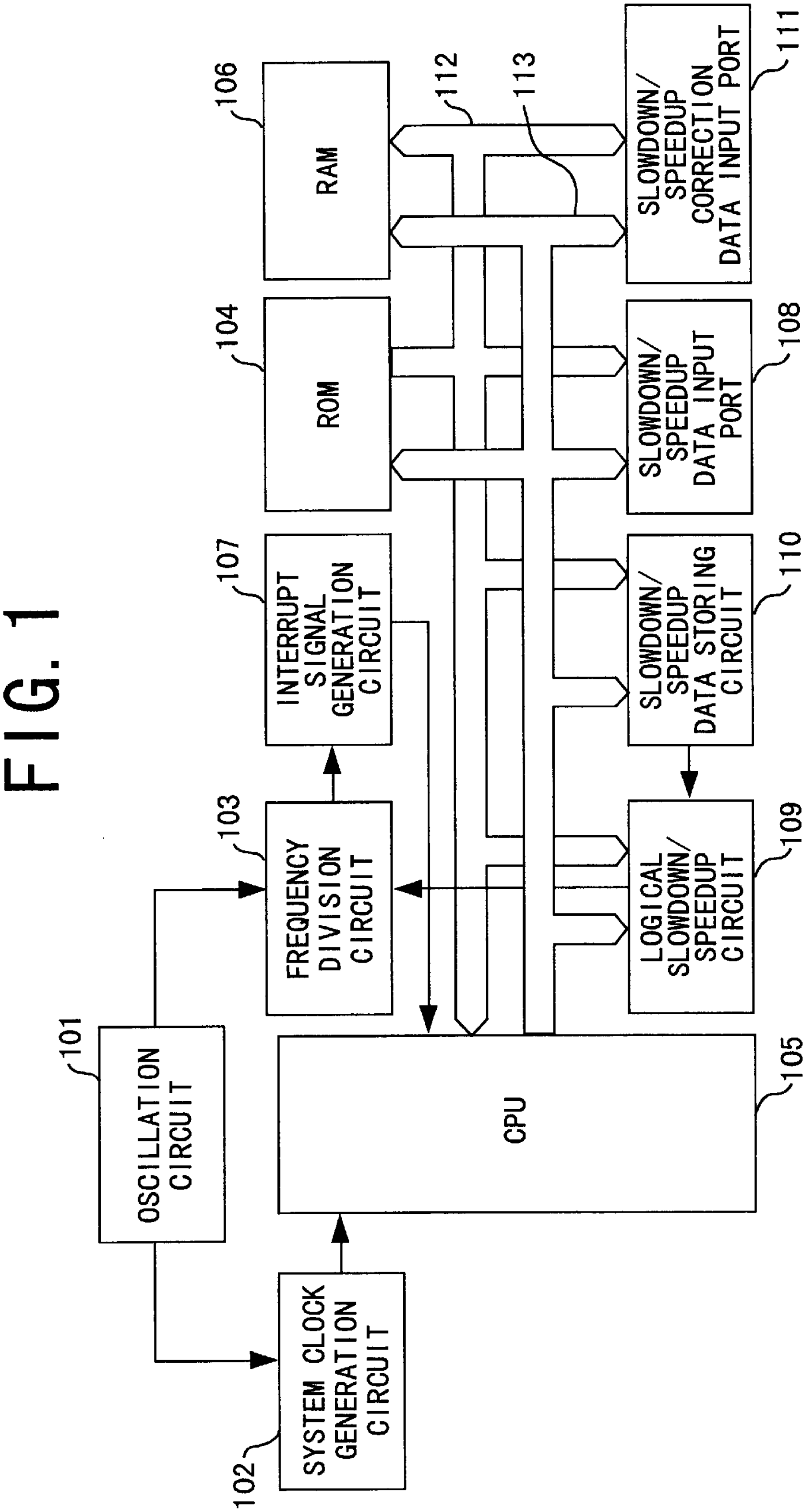
FIG. 1 is a functional block diagram showing an example of an electronic timepiece according to the present invention.
Figure 2:
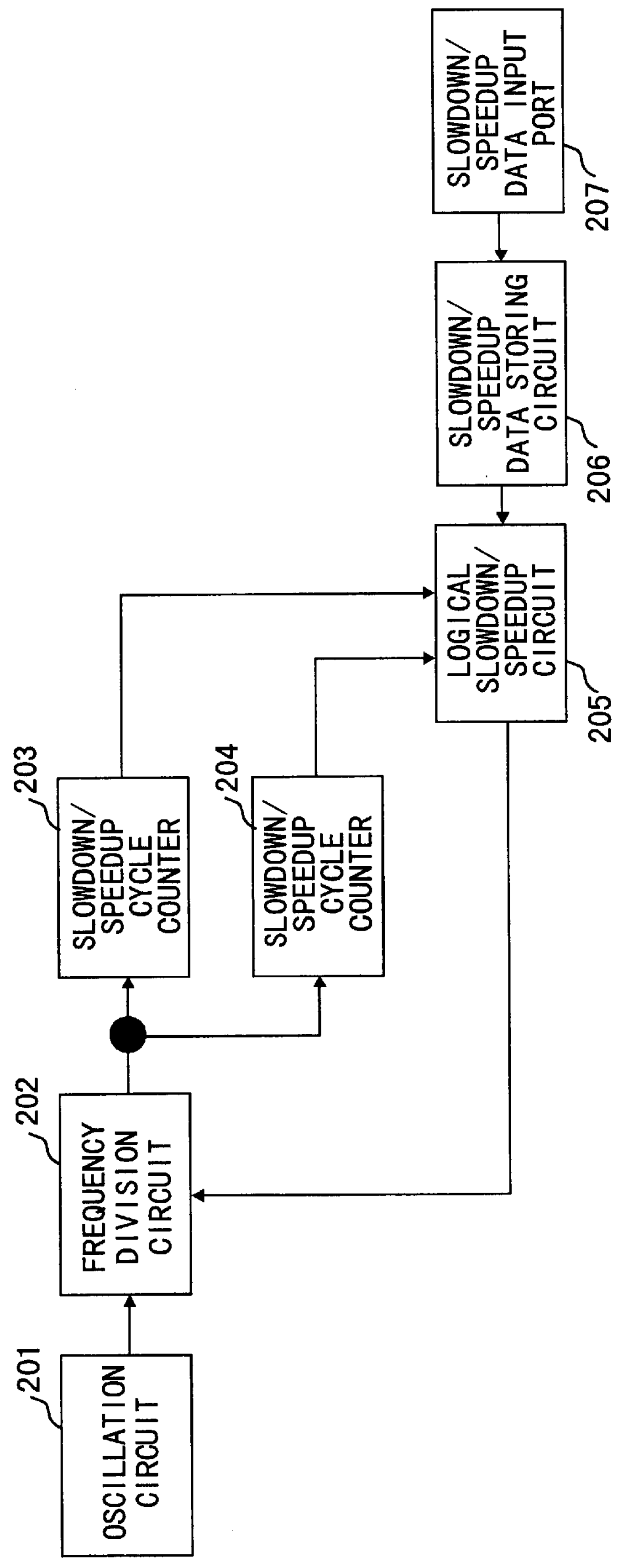
FIG. 2 is a functional block diagram showing a configuration of a conventional electronic timepiece.

FIG. 1 is a functional block diagram showing an example of a typical configuration according to the present invention. In FIG. 1, the output of an oscillation circuit 101 is input to a system clock generation circuit 102, and a CPU 105 for performing various arithmetic processes operates on the system clock. The output of the oscillation circuit 101 is also input to a frequency division circuit 103, and an interrupt signal generation circuit 107 operates on a signal which has been subjected to frequency division at the frequency division circuit 103 to generate an interrupt signal to the CPU 105.

To operate a logical slowdown/speedup circuit 109 for varying the frequency division ratio of the frequency division circuit 103 to adjust accuracy, the CPU 105 starts an interrupt operation in response to the interrupt signal from the interrupt signal generation circuit 107, and an address in the ROM 104 is determined first to send programming data to the CPU 105 over a data bus 112. The CPU 105 interprets the programming data to perform various arithmetic processes. Each time the CPU 105 is interrupted, a logical slowdown/speedup cycle counter allocated in a RAM 106 is incremented; when a predetermined value is counted, an address bus 113 selects an operation control address of the logical slowdown/speedup circuit 109 according to data in the ROM 104; and the logical slowdown/speedup circuit is operated by the data bus 112.

The address bus 113 selects input port addresses from the data of input ports assigned as a slowdown/speedup data input port 108 and a slowdown/speedup correction data input port 111 according to data in the ROM 104 to fetch the slowdown/speedup data in the logical slowdown/speedup circuit 109 into the data bus 112 by a read signal from the CPU 105 and to store it in an accumulator in the CPU 105. An address in a slowdown/speedup data storing circuit 110 is selected based on the data in the ROM 104 and the address bus 113, and the data in the accumulator is stored in the slowdown/speedup data storing circuit 110. The input ports assigned as a slowdown/speedup data input port 108 and a slowdown,/speedup correction data input port 111 may be general purpose input ports or input/output ports as long as they can fetch external data.

FIG. 3 is a list showing amounts of slowdown/speedup in terms of difference per day that depends on combinations of slowdown/speedup cycles and slowdown/speedup data in the logical slowdown/speedup circuit of the present invention. In FIG. 3, when the output of the oscillation circuit 101 is 32 kHz, bits B0–B5 that form the slowdown/speedup data storing circuit 110 correspond to amounts of slowdown/speedup per clock for 32 kHz, 16 kHz, 8 kHz, 4 kHz, 2 kHz and 1 kHz, and an amount of slowdown/speedup per day can be obtained from the following equation.

(1/slowdown/speedup frequency)×86400 sec./slowdown/speedup cycle (sec./day) . . . (1)

Using Equation (1), the amount of slowdown/speedup for a logical slowdown/speedup operation on a cycle of 320 sec. performed at B1 is obtained at (1/16384)×86400/320=16.5 (msec./day).

Figure 4:
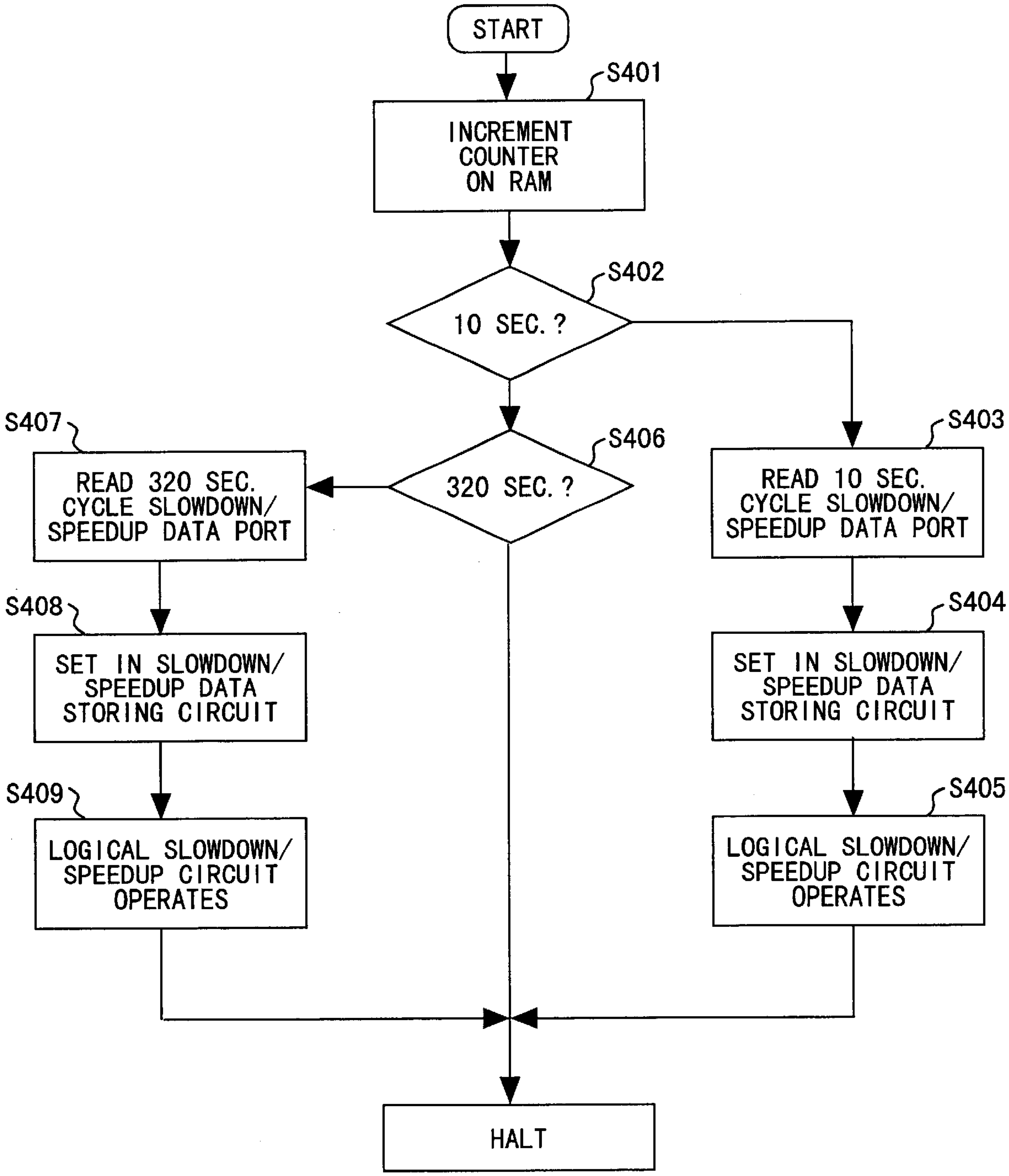
FIG. 4 is a view showing the operational flow of a first mode of carrying out an electronic timepiece according to the present invention.
Figure 5:
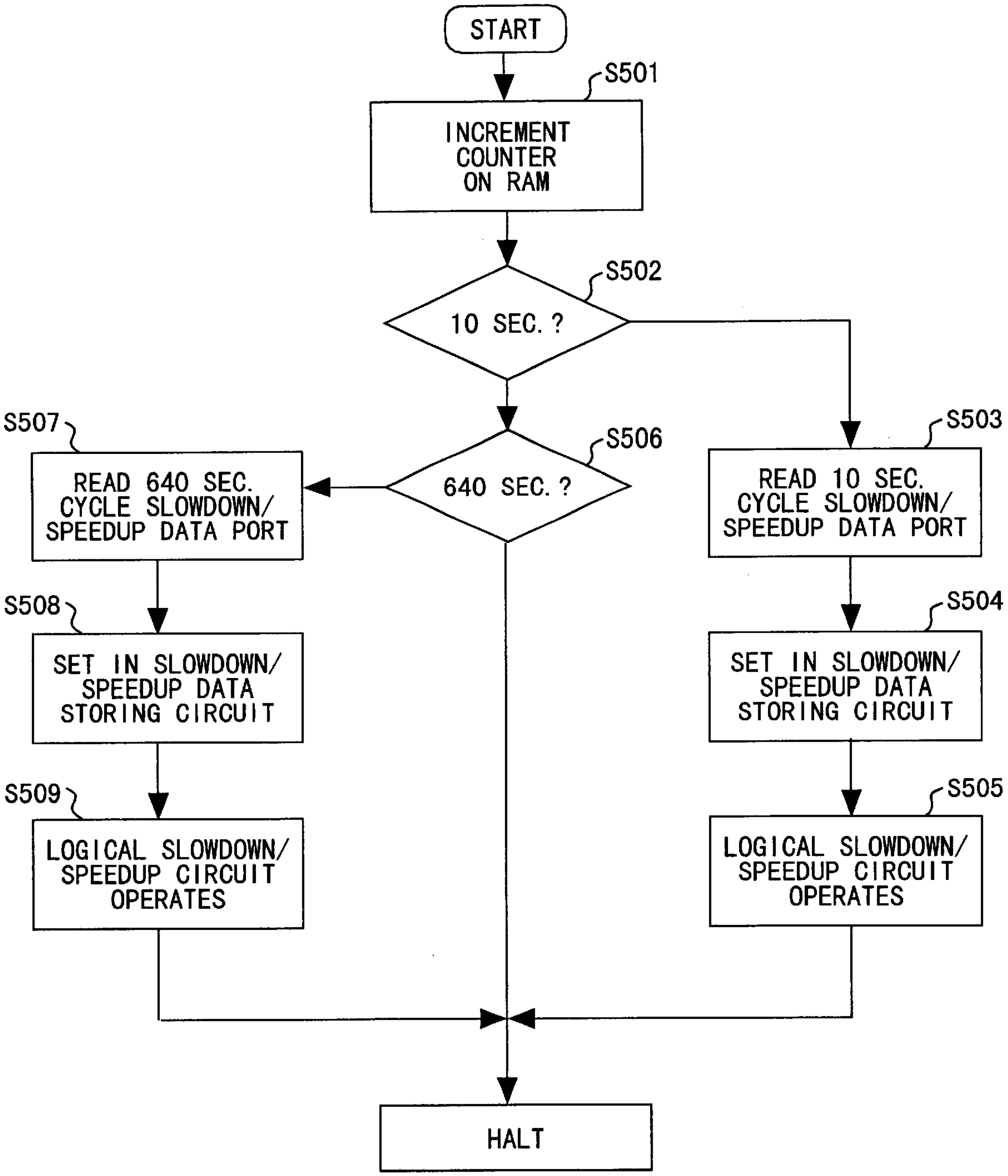
FIG. 5 is a view showing the operational flow of a second mode of carrying out an electronic timepiece according to the present invention.

FIG. 4 is a flow chart showing an operation of an electronic timepiece according to the present invention when the logical slowdown/speedup circuit 109 operates on clocks of 10 sec. and 320 sec. and the slowdown/speedup data has 10 bits. In FIG. 4, the CPU 105 starts an interrupt operation in response to an interrupt signal from the interrupt signal generation circuit 107 to increment a 10 sec. cycle counter and a 320 sec. cycle counter allocated in the RAM 105 (S401). It is determined whether the 10 sec. cycle counter has reached 10 and if it has reached 10, a branch to S403 occurs and, if 10 has not been reached, a branch to S406 occurs (S402). When the 10 sec. cycle counter has reached 10, the 5 bits assigned to the slowdown/speedup data on the 10 sec. cycle among the 10 bits of the slowdown/speedup data input port 108 are fetched (S403). The data in the fetched 5 bits are set in B0–B4 of the slowdown/speedup data storing circuit 110 (S404). The logical slowdown/speedup circuit 109 operates in accordance with the set slowdown/speedup data (S405). When the 10 sec. cycle counter has not reached 10, it is determined whether the 320 sec. cycle counter has reached 320. If it has reached 320, a branch to S407 occurs and, if it has not reached 320, the CPU 105 is halted to initiate a HALT operation (S406). When the 320 sec. cycle counter has reached 320, the 5 bits assigned to the slowdown/speedup data on the 320 sec. cycle among the 10 bits of the slowdown/speedup data input port 108 are fetched (S407). The data in the fetched 5 bits are set in B0–B4 of the slowdown/speedup data storing circuit 110 (S408). The logical slowdown/speedup circuit 109 operates in accordance with the set slowdown/speedup data (S409). Through the above-described operation, the logical slowdown/speedup circuit 109 can perform logical slowdown/speedup with a minimum resolution of 8 msec./day FIG. 5 is a flow chart showing an operation of an electronic timepiece according to the present invention when the logical slowdown/speedup circuit 109 operates on clocks of 10 sec. and 640 sec. and the slowdown/speedup data has 11 bits. In FIG. 5, the CPU 105 starts an interrupt operation in response to an interrupt signal from the interrupt signal generation circuit 107 to increment a 10 sec. cycle counter and a 640 sec. cycle counter allocated in the RAM 105 (S501). It is determined whether the 10 sec. cycle counter has reached 10 and if it has reached 10, a branch to S503 occurs and, if 10 has not been reached, a branch to S506 occurs (S502). When the 10 sec. cycle counter has reached 10, the 5 bits assigned to the slowdown/speedup data on the 10 sec. cycle among the 10 bits of the slowdown/speedup data input port 108 are fetched (S503). The data in the fetched 5 bits are set in B0–B4 of the slowdown/speedup data storing circuit 110 (S504). The logical slowdown/speedup circuit 109 operates in accordance, with the set slowdown/speedup data (S505). When the 10 sec. cycle counter has not reached 10, it is determined whether the 640 sec. cycle counter has reached 640. If it has reached 640, a branch to S507 occurs and, if it has not reached 640, the CPU 105 is halted to initiate a HALT operation (S506). When the 640 sec. cycle counter has reached 640, the 5 bits assigned to the slowdown/speedup data on the 640 sec. cycle among the 10 bits of the slowdown/speedup data input port 108 are fetched (S507). The data in the fetched 5 bits are set in B0–B4 of the slowdown/speedup data storing circuit 110 (S508). The logical slowdown/speedup circuit 109 operates in accordance with the set slowdown/speedup data (S509). Through the above-described operation, the logical slowdown/speedup circuit 109 can perform logical slowdown/speedup with a minimum resolution of 4 msec./day and a maximum of 8.44 sec./day.

Figure 6:
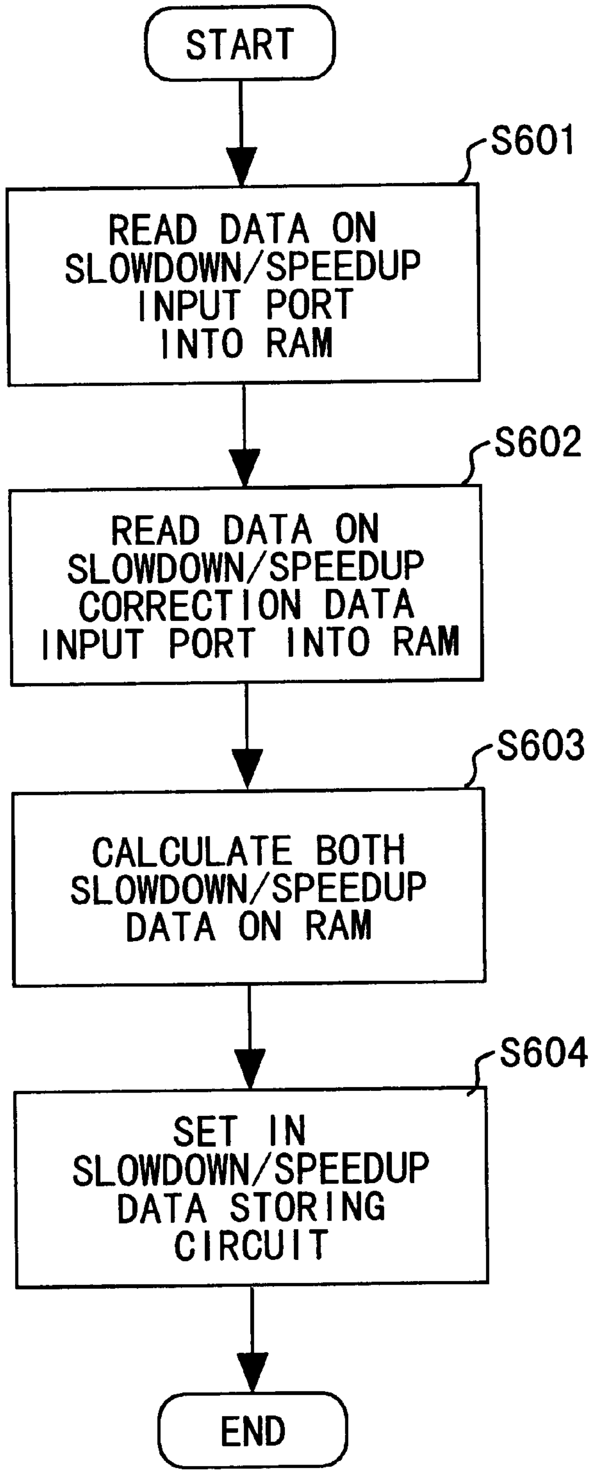
FIG. 6 is a view showing the operational flow of a third mode of carrying out an electronic timepiece according to the present invention.

FIG. 6 is a flow chart showing a process of correcting slowdown/speedup data in an electronic timepiece according to the present invention. In FIG. 6, slowdown/speedup data read through the slowdown/speedup data input port 108 are written in a first arithmetic region allocated in the RAM 106 (S601). Slowdown/speedup data read through the slowdown/speedup correction data input port 111 are written in a second arithmetic region allocated in the RAM 106 (S602). The data written in the second arithmetic region are assigned to the respective bits B0 through B5 according to programming data in the ROM 104 and are added to or subtracted from the bits in the first arithmetic region corresponding to the assigned bits (S603). The data in the first arithmetic region which have been calculated are set in the slowdown/speedup data storing circuit 110 (S604). Then, the operation, shown in FIG. 4 or FIG. 6 follows.

Industrial Applicability

According to the invention, as described above, since a slowdown/speedup cycle and the number of the bits of slowdown/speedup data can be arbitrarily set according to data programmed in a ROM, it is possible to easily change the resolution for accuracy adjustment and adjustable range in accordance with the manufacturing system of the factory. Further, the amount of adjustment required for re-adjustment of accuracy in the market can be also easily reset based on information on the retail shop and the like by changing the data programmed in the ROM.

What is claimed is:

1. An electronic timepiece comprising:

an oscillation circuit;

a system clock generation circuit for receiving an output of the oscillation circuit and generating a system clock based on the output of the oscillation circuit;

a frequency division circuit for frequency dividing the output of the oscillation circuit and producing a frequency-divided output signal used for counting time;

a ROM for storing program data used for performing processing procedures including a time-measuring operation based on the system clock;

a CPU for interpreting the data programmed in the ROM and performing arithmetic processes in accordance therewith;

a RAM for storing data;

an interrupt signal generation circuit for generating an interrupt signal and supplying the interrupt signal to the CPU;

a slowdown/speedup data input port for taking in slowdown/speedup data supplied from outside the timepiece;

a logical slowdown/speedup circuit for adjusting the accuracy of the timepiece by varying the frequency division ratio of the frequency division circuit to modify the frequency-divided output signal to adjust time counting accuracy of the timepiece; and a slowdown/speedup data storing circuit for storing slowdown/speedup data that is used to determine the amount of variation of the frequency division ratio performed by the logical slowdown/speedup circuit;

wherein the logical slowdown/speedup circuit is responsive to the interrupt signal from the interrupt signal generation circuit to perform accuracy adjustment by varying the frequency dividing ratio of the frequency division circuit in accordance with the program data in the ROM at least at two cycles which are counted in the RAM by the CPU, and causes the slowdown/speedup data to be fetched through the slowdown/speedup data input port and stored in the slowdown/speedup data storing circuit at the two cycles in an arbitrary combination according to the data programmed in the ROM.

2. An electronic timepiece according to claim 1; further comprising a slowdown/speedup correction data input port for taking in data from outside the timepiece for correcting the slowdown/speedup data input through the slowdown/speedup data input port;

wherein the logical slowdown/speedup circuit operates by causing the slowdown/speedup data storing circuit to store the data fetched through the slowdown/speedup data input port and the slowdown/speedup correction data input port which have been calculated on the RAM by the CPU in accordance with the data programmed in the RAM.

3. Accuracy adjustment structure for an electronic timepiece, comprising: a clock generator for generating a clock signal; a frequency dividing circuit for frequency dividing the clock signal and producing a divided output signal used for counting time; a slowdown/speedup data input port for inputting slowdown/speedup data supplied externally of the timepiece; and a logical slowdown/speedup circuit for adjusting the timekeeping accuracy of the timepiece by varying the frequency dividing ratio of the frequency dividing circuit in accordance with the slowdown/speedup data, and being operative to conduct timekeeping adjustment at two independent cycles by causing slowdown/speedup data to be fetched at each cycle and using the fetched slowdown/speedup data to adjust the frequency dividing ratio of the frequency dividing circuit during each cycle.

4. Accuracy adjustment structure for an electronic timepiece according to claim 3; further comprising a slowdown/speedup data storing circuit for storing slowdown/speedup data used to determine the amount of slowdown/speedup performed by the logical slowdown/speedup circuit.

5. Accuracy adjustment structure for an electronic timepiece according to claim 3; further comprising a slowdown/speedup data input port for inputting slowdown/speedup data supplied from outside the timepiece.

6. Accuracy adjustment structure for an electronic timepiece according to claim 3; further comprising a processing circuit for counting time on the basis of the divided output signal and performing arithmetic processes.

7. Accuracy adjustment structure for an electronic timepiece according to claim 6; further comprising an interrupt signal generation circuit for generating an interrupt signal and supplying the interrupt signal to the processing circuit to initiate a clock to count the two cycles.

8. Accuracy adjustment structure for an electronic timepiece according to claim 3; further comprising a slowdown/speedup correction data input port for inputting data from outside the timepiece for correcting the slowdown/speedup data input through the slowdown/speedup data input port.

* * * * *